(12) United States Patent
Boussicot et al.

(10) Patent No.: US 8,943,643 B2
(45) Date of Patent: Feb. 3, 2015

(54) LOCKING DEVICE BETWEEN A WIPING BLADE AND A WINDSCREEN WIPER BLADE HOLDER

(75) Inventors: Frederic Boussicot, Creteil (FR); Jean-Michel Jarasson, Elancourt (FR); Gerald Caillot, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 1347 days.

(21) Appl. No.: 12/066,796

(22) PCT Filed: Sep. 12, 2006

(86) PCT No.: PCT/EP2006/008843
§ 371 (c)(1),
(2), (4) Date: Aug. 6, 2008

(87) PCT Pub. No.: WO2007/031260
PCT Pub. Date: Mar. 22, 2007

(65) Prior Publication Data
US 2008/0289134 A1 Nov. 27, 2008

(30) Foreign Application Priority Data
Sep. 13, 2005 (FR) ...................................... 05 09319

(51) Int. Cl.
B60S 1/38 (2006.01)

(52) U.S. Cl.
CPC ............... *B60S 1/381* (2013.01); *B60S 1/3891* (2013.01); *B60S 1/386* (2013.01); *B60S 1/3881* (2013.01); *B60S 2001/3822* (2013.01)
USPC .................... 15/250.43; 15/250.201

(58) Field of Classification Search
USPC ........... 15/250.451–250.454, 250.44, 250.43, 15/250.361, 250.201
See application file for complete search history.

(56) References Cited

U.S. PATENT DOCUMENTS

| 3,372,422 | A | * | 3/1968 | Anderson | ................ | 15/250.453 |
| 5,598,603 | A | * | 2/1997 | Mege et al. | ................ | 15/250.454 |
| 6,112,365 | A | | 9/2000 | Ullrich et al. | | |
| 6,253,412 | B1 | | 7/2001 | Herrmann et al. | | |
| 6,311,363 | B1 | * | 11/2001 | Kessler et al. | ........... | 15/250.454 |
| 2004/0200026 | A1 | | 10/2004 | Shanmugham | | |

FOREIGN PATENT DOCUMENTS

| DE | 100 08 272 A1 | 11/2001 |
| DE | 102 45 693 A1 | 4/2004 |
| EP | 0 646 507 A2 | 4/1995 |
| GB | 2 336 293 | 10/1999 |
| JP | 05-044726 U | 6/1993 |
| JP | 10-24806 | 1/1998 |

OTHER PUBLICATIONS

International Search Report (French and English) for PCT/EP2006/008843 mailed Dec. 11, 2006 (6 pages).

* cited by examiner

*Primary Examiner* — Gary Graham
(74) *Attorney, Agent, or Firm* — Osha Liang LLP

(57) ABSTRACT

The present invention relates to a locking device (14, 45, 52, 56, 66) between a windscreen wiper blade holder (2) and a windscreen wiper blade (13), said blade (13) consisting of a top part (15) that is capable of cooperating with said blade holder (2) and a bottom part (16) in direct contact with the windscreen or window to be wiped, said device (14, 45, 52, 56, 66) having a shape that complements said top part (15) of said blade (13), characterized in that it is capable of being solidly attached to linking means (29), said linking means (29) connecting one of the ends of said blade holder (2) to one of the ends of said blade (13).

11 Claims, 11 Drawing Sheets

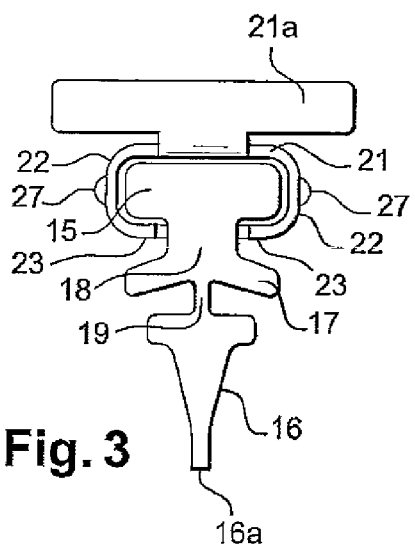
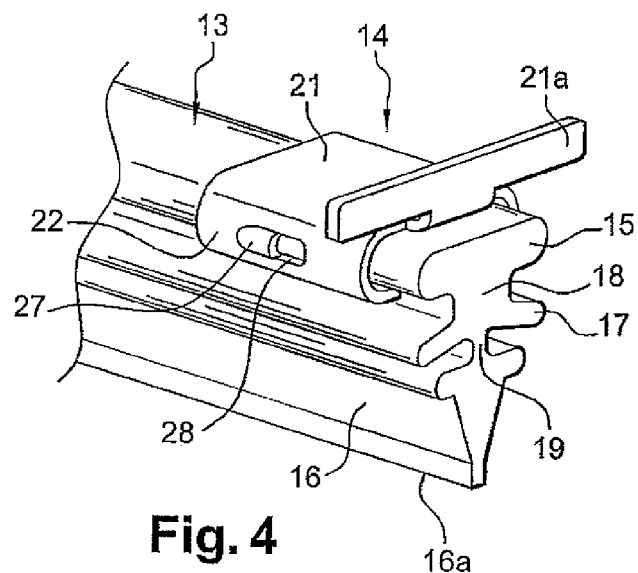
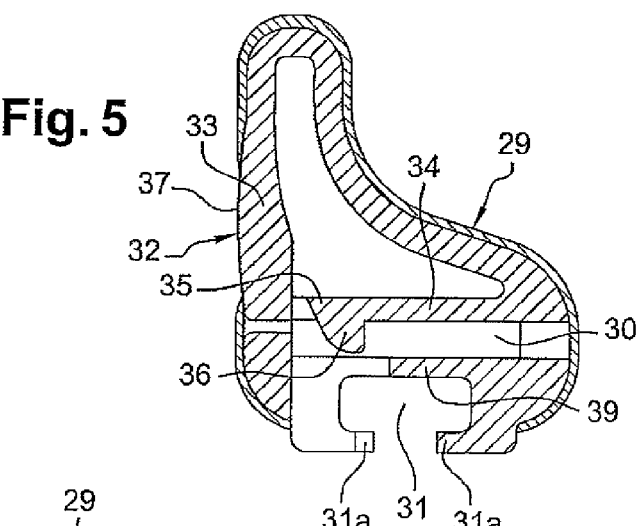
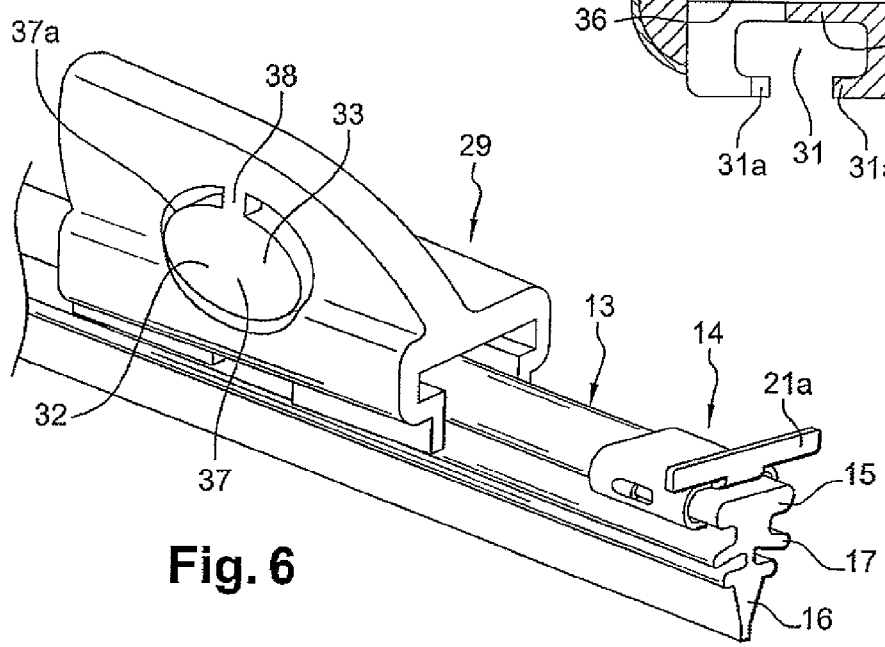

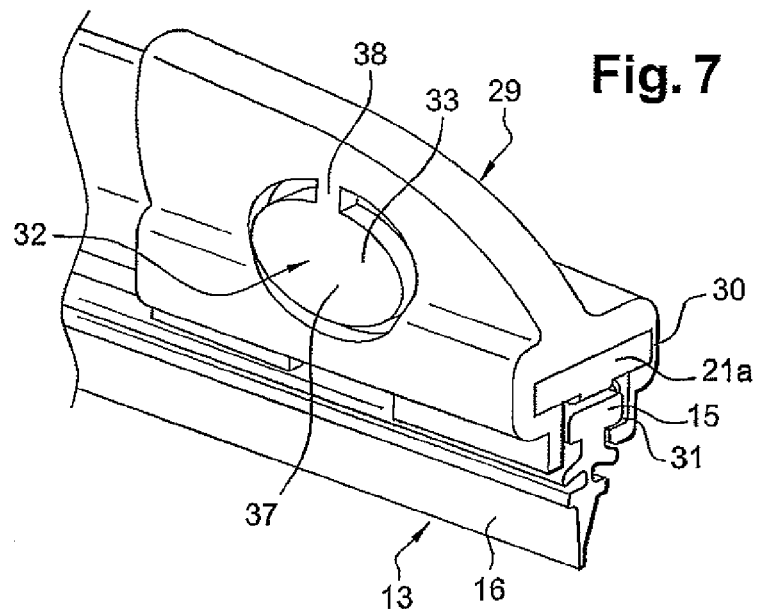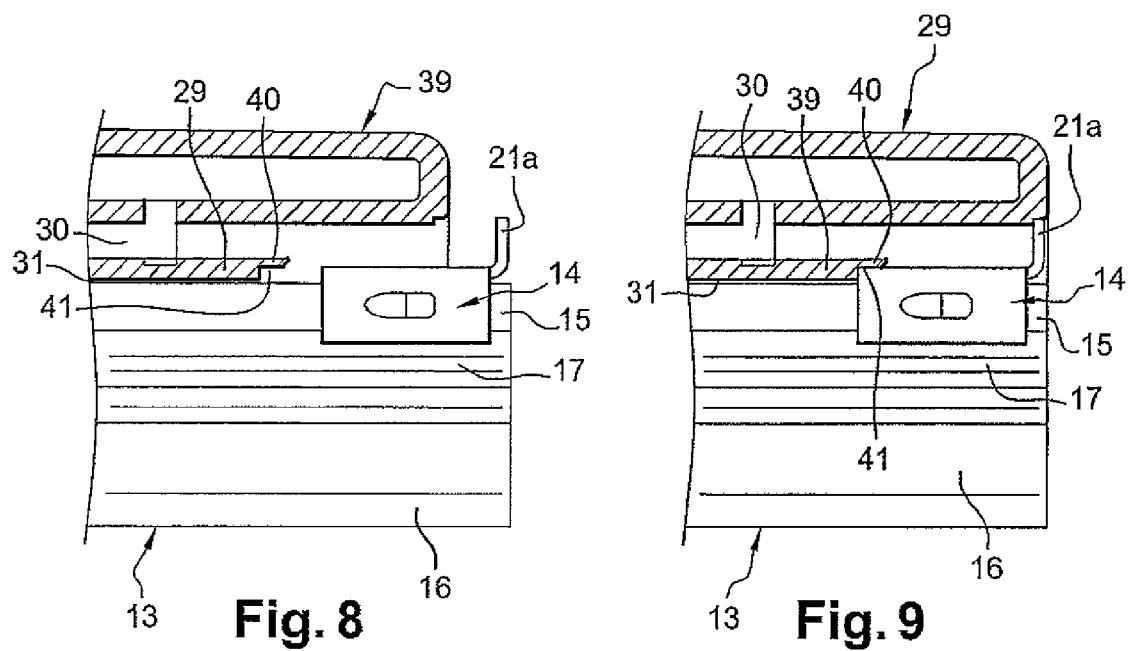

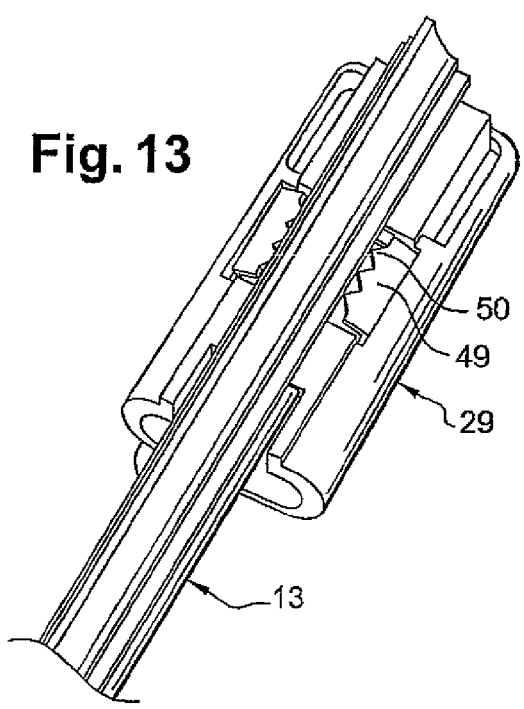
Fig. 13
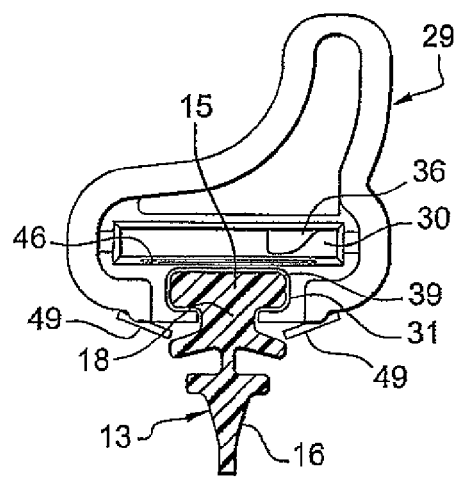
Fig. 14
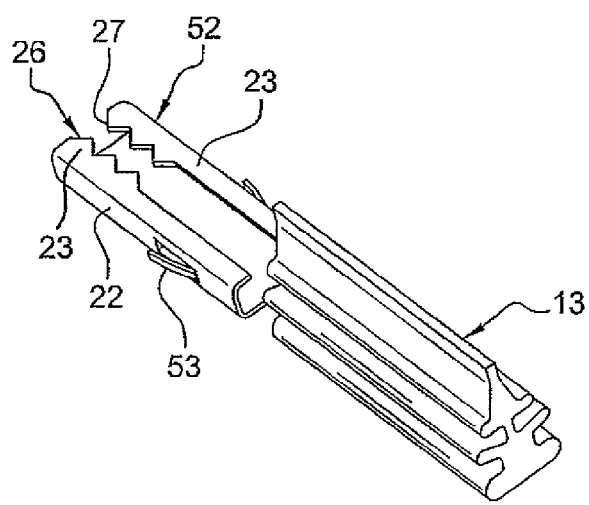
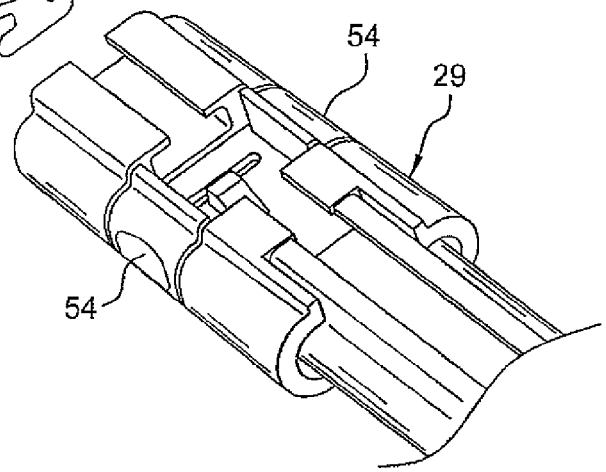
Fig. 15

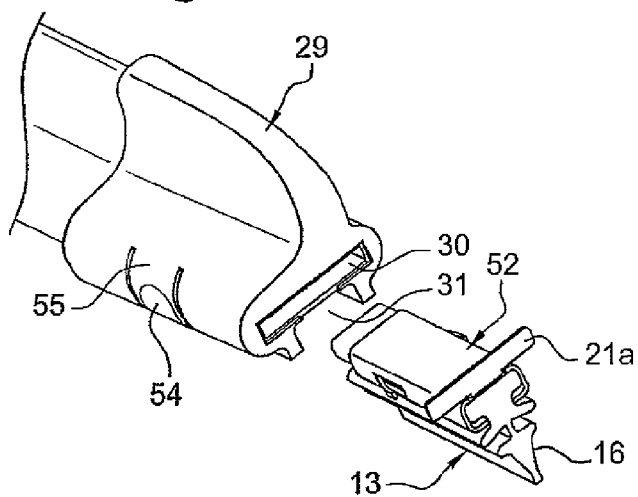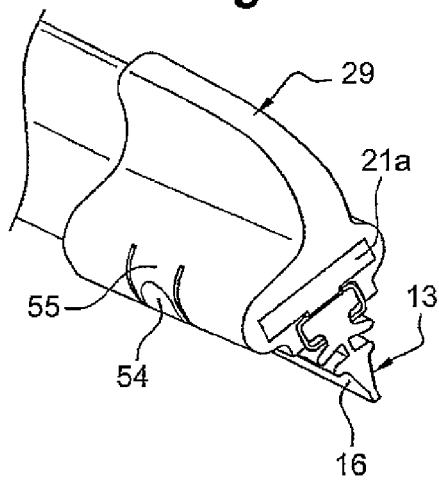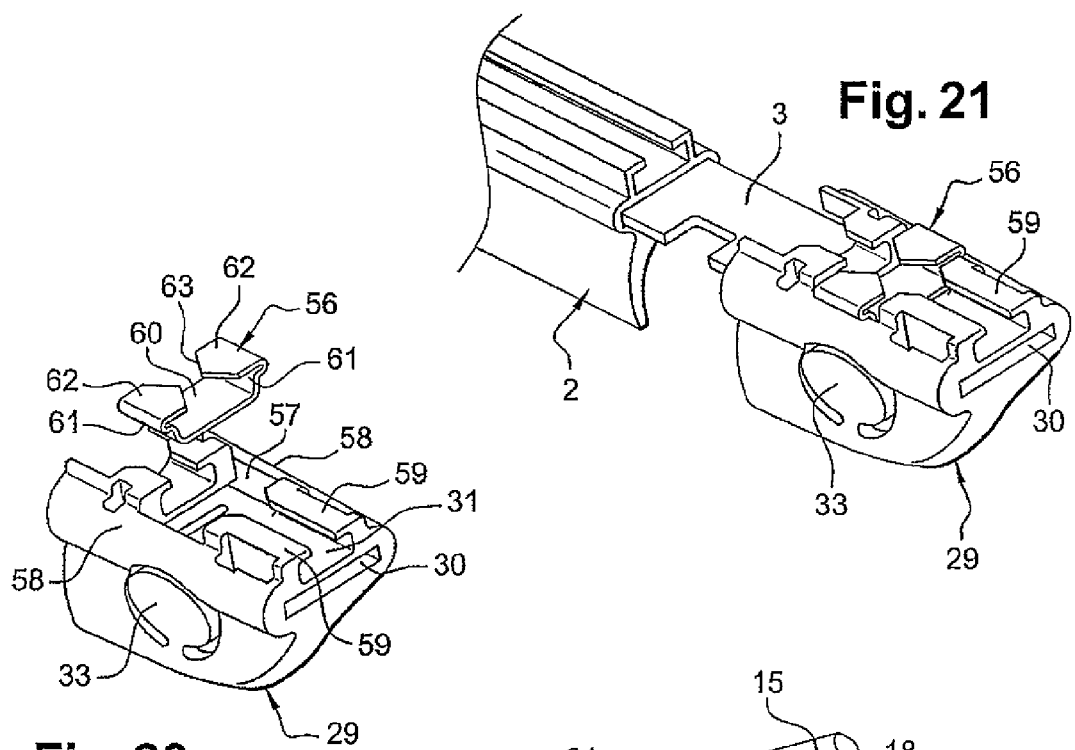

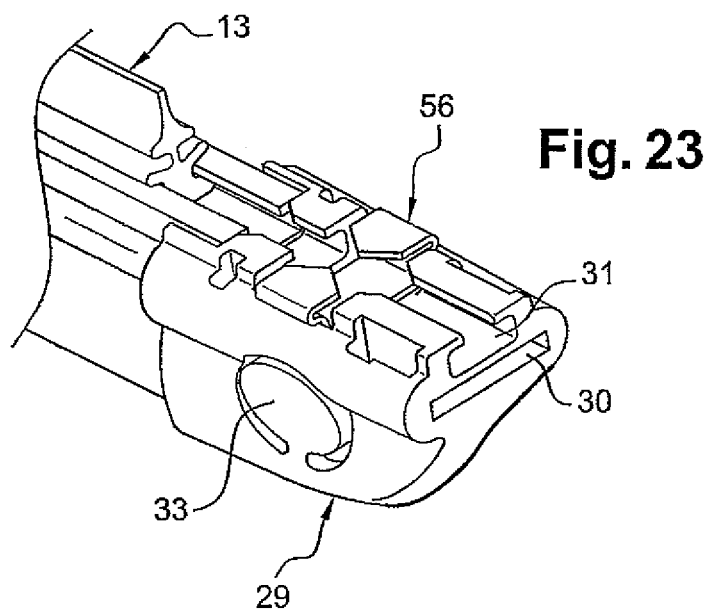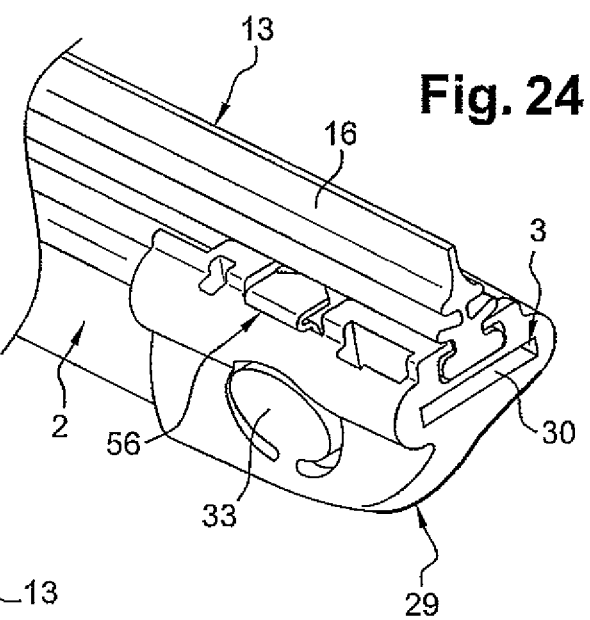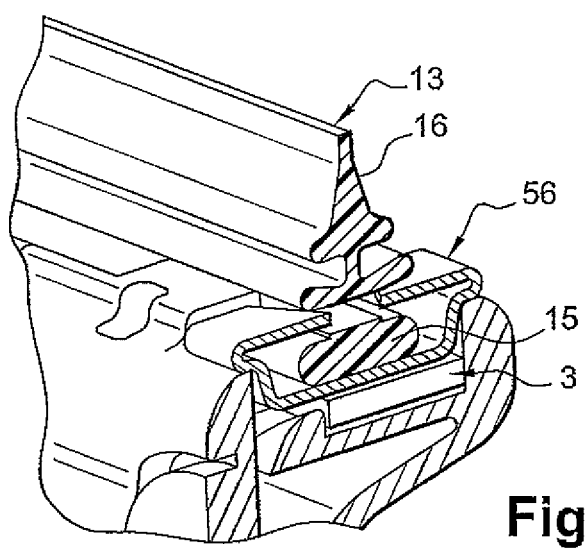

LOCKING DEVICE BETWEEN A WIPING BLADE AND A WINDSCREEN WIPER BLADE HOLDER

The invention relates to a locking device between a wiping blade and a windscreen wiper blade holder.

Windscreen wiper arms, in particular of motor vehicles, generally consist of a mobile drive arm that is capable of moving a wiper comprising a support frame or a windscreen wiper blade holder and a wiping blade that is capable of being pinned against a window or a windscreen.

However, the wiping blade tends to wear with the use of the windscreen wiper, and should be replaced often.

Furthermore, the blade holder needs to be attached to the windscreen wiper blade in a straightforward manner while allowing easy replacement of the blade.

In addition, it would be particularly useful to provide locking means between the blade and the blade holder that cost less and make it possible to ensure a certain connection between the blade and the blade holder.

The prior art has already provided solutions with this aim.

Therefore, according to U.S. Pat. No. 6,253,412, a locking device is provided that comprises at least one tab with a hook, this at least one tab being capable of being arranged against the lateral edges of the wiping blade support frame and of being inserted in the clip-shaped ends that support the support frame, the clip-shaped ends being a part of a framework connected to an arm that drives the windscreen wiper.

This principle of locking the support frame with the windscreen wiper blade is also applied in different forms in patents U.S. Pat. No. 6,112,365 and EP 0 943 511.

However, the prior art does not suggest how to create a locking device that is capable of connecting and locking a support frame and a windscreen wiper blade when the windscreen wiper has a different shape in other words, when the wiper is driven by a drive arm that is fixed directly by connection means fixed to the median point of the support frame.

Therefore, the present invention applies more specifically to windscreen wipers of the so-called flat blade type, that is to say, wipers that do not have a framework connected to the two ends of the support frame, but rather only have one connection point with a drive arm approximately at their median point.

The embodiments of the invention according to the prior art cannot be used for this type of windscreen wiper.

It would therefore be particularly advantageous to create a locking device for this type of windscreen wiper that can be easily replaced, manufactured at a lower cost and that is less bulky, for physical and aesthetic reasons.

The present invention relates to a locking device between a windscreen wiper blade holder and a windscreen wiper blade, the blade consisting of a top part that is capable of cooperating with the blade holder and a bottom part that is in direct contact with the windscreen or the window to be wiped, the device having a shape that complements the top part of said blade, characterised in that it is capable of being solidly attached to linking means that connect one of the ends of the blade holder with one of the ends of the blade, the linking means comprising an inner recess in which a spine that is a constituent part of the windscreen wiper can be inserted, and which has a free space in which the top part of the blade can be inserted.

The locking device advantageously has blocking means on the blade, either in the form of at least one tooth that is capable of partially sticking into the blade, or in the form of at least one tooth that can be inserted in a groove made in the blade.

The device is made from a metal material in order to allow the blocking of the locking device on the blade.

The device is advantageously fixed in a solid and irremovable fashion either to the blade or to said blade and the linking means.

In order to allow the replacement of the blade, the linking means can have separating means that are capable of separating the solid blade/locking device/spine linking means assembly, or separating means that are capable of separating the solid blade/spine locking device assembly and the linking means, the separating means being presented in the form of at least one push button.

In order to allow the solid attachment of the spine with the linking means, the spine is held in the inner recess with the help of hooking means in the form a flexible flap that comprises one hook-shaped end.

In order to prevent the entry of foreign bodies in the linking means, the device according to the invention comprises a transversal wall that is capable of blocking the inner recess.

According to one embodiment of the invention, the linking means are moulded onto the device, which is presented in the form of a plate comprising a pair of claws that are capable of sticking into the blade, the plate being capable of being flattened in the inner recess.

According to an alternative embodiment, the device according to the invention is presented in the general shape of a hollow parallelepiped made up of a top wall, two lateral walls and two bottom walls, each lateral wall including a protrusion that is capable of blocking the device in the linking means.

According to an alternative embodiment of the invention, each lateral wall has a flexible locking tab that is capable of blocking said device in said linking means, at least one push button, provided in the linking means, being capable of pinning the locking tab against the lateral wall in order to separate the device according to the invention from the linking means.

According to yet another embodiment of the invention, the device is capable of being inserted in a material indentation made in the linking means so as to make up a part of the walls that form the free space.

In an advantageous or alternative manner, a lug is provided on the linking means that is capable of separating the spine from the hooking means in the form of the flexible flap.

According to a further alternative embodiment of the invention, the device has hooking means on the linking means in the form of a hook that can be inserted in an orifice made in the linking means, the device having a transversal wall with a shape that complements an indentation made in the linking means, the hook-shaped end of the hook being capable of hooking onto a lateral wall of the linking means, the push button being capable of pivoting until it unhooks the hook-shaped end of the lateral wall from the linking means.

The present invention is described below with the help of merely descriptive examples that do not limit the scope of the present invention, and with the help of the appended illustrations, in which:

FIGS. 3 and 4 are, respectively front perspective views of the device according to the invention, solidly attached and fixed to the windscreen wiper blade;

FIG. 5 is a cross-section view of the linking means between the locking device according to the invention, the windscreen wiper blade and the support frame;

FIGS. 6 and 7 are, respectively, perspective views of the linking means of FIG. 5 before and after being solidly attached to the locking device according to the invention;

FIGS. 8 and 9 are, respectively, longitudinal cross-section views of the linking means of FIG. 5 before and after being solidly attached to the locking device according to the invention;

FIGS. 12 and 13 are, respectively, perspective views of the locking device according to the second embodiment of the invention solidly attached to the linking means between the windscreen wiper blade and the support frame, before and after being solidly attached to the windscreen wiper blade;

FIG. 14 is a transversal cross-section view of the linking means solidly attached to the locking device according to the second embodiment of the invention;

FIGS. 15 and 16 are, respectively, perspective views of a third embodiment of the locking device according to the invention before and after being solidly attached to the linking means between the windscreen wiper blade and the support frame;

FIGS. 18 and 19 are perspective views of an alternative embodiment of the third embodiment of the locking device before and after being inserted in the linking means;

FIG. 20 is a perspective view of a fourth embodiment of a locking device according to the invention prior to being installed on the linking means between the windscreen wiper blade and the support frame;

FIG. 21 is a perspective view of the assembly step of the linking means on the support frame and the spine of a windscreen wiper;

FIG. 22 is a partial perspective view of the windscreen wiper blade capable of cooperating with the locking device according to the fourth embodiment of the invention;

FIGS. 23 and 24 show two perspective views of the insertion step of the windscreen wiper blade in the linking means according to the fourth embodiment of the invention;

FIG. 25 is a cross-section view at the height of the locking device of the linking means according to the fourth embodiment of the invention;

FIG. 1 shows a windscreen wiper with reference number 1, advantageously of a known type, called flat blade, comprising a substantially longitudinal blade holder or a support frame 2.

Figure 1:
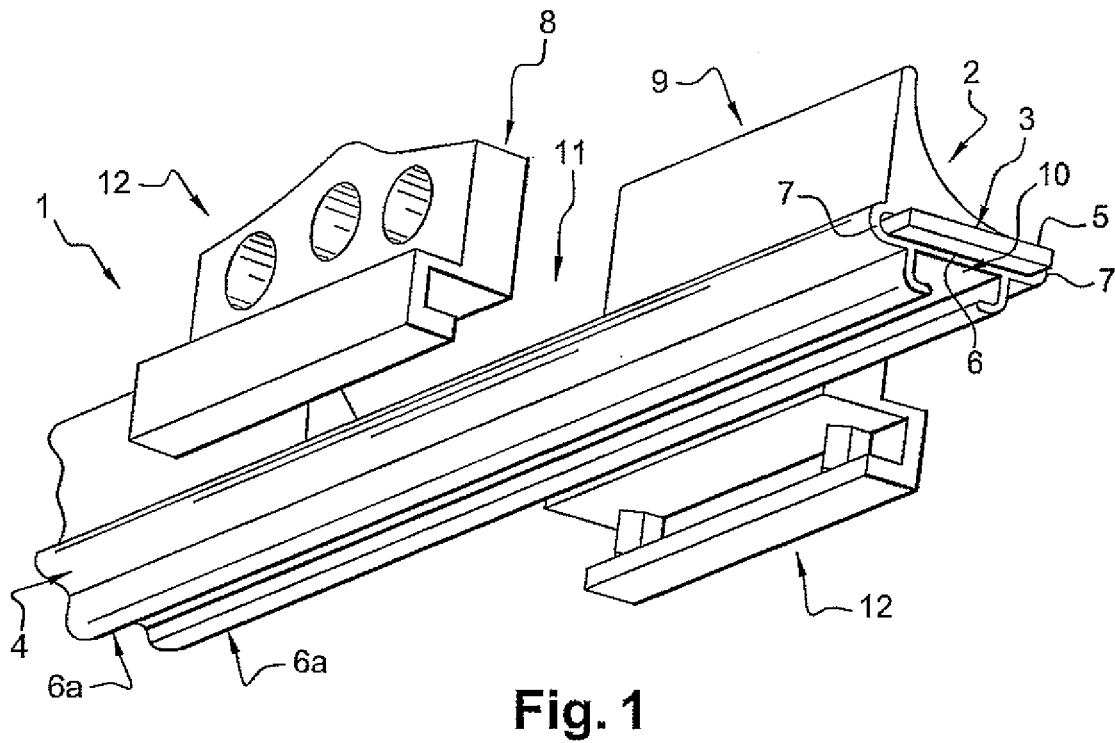
FIG. 1 is a perspective view of a known type of support frame that is capable of being associated with a windscreen wiper blade and with connection means that are capable of being connected to a drive arm.

The support frame 2 consists of an inner spine 3 made up of a longitudinal horizontal blade inserted in a tubular central body 4 with a substantially longitudinal main axis delimited by a horizontal top wall 5, a horizontal bottom wall 6 and two vertical longitudinal lateral walls 7.

In the rest of the description, "longitudinal direction" or "horizontal direction" will be used to refer to the direction that is parallel to the longitudinal axis of the windscreen wiper blade, and "transversal direction" or "vertical direction" will be used to refer to the direction that is perpendicular to the longitudinal axis of the inner spine, located on the same plane as the inner spine 3.

Connection means 8 are provided for connecting the windscreen wiper 1 to a drive arm (not shown in the figure but of a known type).

An upper rib 9 pointing vertically upwards is provided on the outer surface of the top wall 5 of the central body 4.

The upper rib 9 is advantageously formed such as to produce forces that pin the windscreen wiper 1 against the surface of the window or windscreen, due to the relative action of the wind during the movement of the vehicle, thereby providing in creased adherence of the wiping blade on the window or windscreen.

The bottom wall 6 of the central body 4 of the hooking means are also provided with a wiping blade 13 in the form of a pair of opposing longitudinal hooks 6a pointing towards each other and forming an open inner space 10 in which the top of a blade 13 can be inserted.

The upper rib 9 has an indentation 11 in which the linking means or connector 8 are installed on the support frame 2.

The connector 8 is made up of two identical symmetrical parts 12 and is advantageously installed on the central part of the support frame 2, covering the top wall 5 of the main body 4 and the two lateral walls 7.

Figure 2:
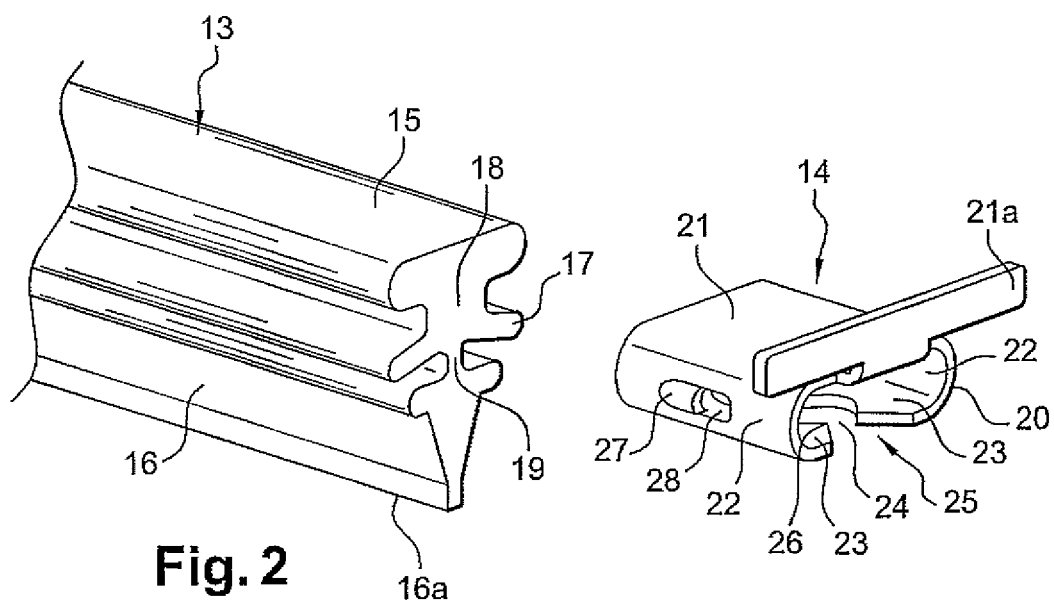
FIG. 2 is a perspective view of a windscreen wiper blade and of the locking device according to the invention prior to being solidly attached to the blade.

FIG. 2 shows a perspective view of a windscreen wiper blade 13 and of the locking device 14 according to the invention before being solidly attached to the blade 13.

The wiping blade 13 is of a known type and is advantageously made up of:

a so-called "top" part 15 in the form of a longitudinal element having a substantially rectangular transversal cross-section with its four corners rounded;

a so-called "bottom" part 16 in the form of a longitudinal element having a triangular transversal cross-section, advantageously in the shape of an isosceles triangle, in which the point 16a is in direct contact with the window or the windscreen to be wiped, and an intermediate part 17 in the form of a longitudinal element having a transversal cross-section forming an arc of circle in which the two ends point towards the bottom part 16.

The top 15 and intermediate 17 parts are connected to each other by a substantially longitudinal so-called top linking element 18, and the intermediate 17 and bottom 16 parts are also connected to each other by a substantially longitudinal so-called bottom linking element 19.

The locking device 14 according to the first embodiment of the invention is presented in the general shape of a hollow parallelepiped 20 in which the corners are rounded and which has a shape that complements and is slightly larger than the top part 15 of the windscreen wiper blade 13.

The hollow parallelepiped 20 consists, more specifically, of a substantially horizontal top wall 21, two lateral walls 22 and two bottom walls 23.

The locking device 14 is advantageously made from a metal material, while the windscreen wiper blade 13 is advantageously made from rubber.

The bottom walls 23 are separated from each other by a space 24 in which the top linking element 18 can be inserted by sliding.

The free end of each bottom wall 23 advantageously has blocking means 25 on the blade 13 in the form of a plurality of teeth 26 that are capable of compressing the top linking element 18 of the blade 13.

In addition, each lateral wall 22 comprises a protrusion 27 and an orifice 28 with functions that will be explained subsequently.

Prior to the installation of the hollow parallelepiped 20 on the rubber blade 13, the lateral walls 22 are slightly tilted (open) initially in relation to a perpendicular line of the top wall 21 ("opening" of the bottom area), such as to facilitate the sliding and the solid attachment of the parallelepiped 20 on the blade 13.

FIGS. 3 and 4 are, respectively, front and perspective views of the device 14 once it has been fixed on the top part 15 of the blade 13.

In order to fix the device 14 on the blade 13 and after solidly attaching the device 14 to the blade 13, the user must exert pressure on the lateral walls 22 of the device 14 in order to compress and push, with more or less strength, the blocking means 25 in the form of teeth 26 into the top linking element 18, the lateral walls 22 being in a substantially vertical position following this tightening operation.

The locking device 14 is advantageously made from a slightly deformable metal material so that the user can bring the lateral walls 22 closer to each other once the device 14 is placed on the top part 15 of the blade 13 thus allowing the teeth 26 to penetrate in the top linking element 18.

It is evident that this solid attachment operation can be carried out thanks to the materials used for manufacturing the blade 13 (rubber) and the device according to the invention 14 (a metal material).

Once this operation has been performed, it is no longer possible to separate the locking device 14 from the blade 13 without damaging the blade 13.

The top wall 21 of the locking device 14 has a substantially vertical transversal wall 21*a* arranged on one of the edges of the top wall 21, advantageously the edge of the top wall 21 that is closest to the end of the rubber blade 13 once the locking device 14 has been placed on this blade 13.

FIG. 5 is a cross-section view of the linking means 29 between the locking device 14 according to the invention and the support frame 2, FIGS. 6 and 7 being, respectively, perspective views of these linking means 29 before and after being solidly attached to the locking device 14.

In the usual manner the linking means 29 are normally called "end-clips" by those skilled in the art and consist of an inner recess 30 in which the spine 3 can be inserted and a free space 31 in which the top part 15 of the blade 13 can be inserted.

The locking device 14 is also advantageously capable of being inserted in the linking means 29.

The linking means 29 also have means for separation 32 from the spine 3 in the form of a push button 33 that is capable of exerting pressure on a flexible inner flap 34 integrated in the linking means 29, the flexible flap 34 having a free end 35 with a hook 36 that is capable of holding the spine 3 when it is inserted in the inner recess 30.

In a more specific manner, the push button 33 consists of a wall 37 delimited by a groove 37*a* and only having one point 38 that connects it with the rest of the linking means 29.

Therefore, when the user presses the push button 33, the single linking point 38 forming a swivel axis, then the wall 37 that makes up this button 33 swivels slightly towards the inside of the linking means 29.

In this way, the wall 37 (inner side advantageously comes to a stop against the free end 35 of the flexible flap 34 and thereby causes its partial elevation.

In this way, the hook 36 no longer holds the spine 3 and the latter can be separated from the linking means 29.

FIGS. 8 and 9 are, respectively, longitudinal cross-section views of the linking means 29 before and after being solidly attached to the locking device 14.

It can therefore be said that the inner recess 30 and the free space 31 of the linking means 29 are combined approximately at the end of the windscreen wiper blade 13, approximately at the area of the blade 13 on which the locking device 14 is fixed, when the latter is inserted in the linking means 29.

The inner recess 30 and the free space 31 are advantageously separated by a longitudinal wall 39, the free end 40 of this wall 39 being capable of resting against the edge of the top wall 21 of the locking device 14, and more specifically the edge opposite the edge on which the transversal wall 21*a* is fixed.

More specifically, once the windscreen wiper blade 14 is inserted in the free space 31, then the free edge (in other words the transversal wall 21*a*) of the top wall 21 is inserted in the free end 40 of the wall 39 in an indentation 41 intended for blocking the device 14.

In this way, the locking device 14 is blocked on the windscreen wiper blade 13 and no vertical movement of this device 14 is possible.

It can also be said, in reference to FIGS. 7 to 9, that the transversal wall 21*a* has a shape that complements the inner recess 30.

Therefore, when the windscreen wiper blade 13 and the locking device 14 are completely inserted in the linking means 29, then the transversal wall 21*a* closes the inner recess 30, thus preventing any foreign bodies, such as dust or water, from entering the linking means 29 and causing them to clog or corrode (as well as considerably improving the aesthetics of the assembly, since the opening is no longer visible).

Figure 10:
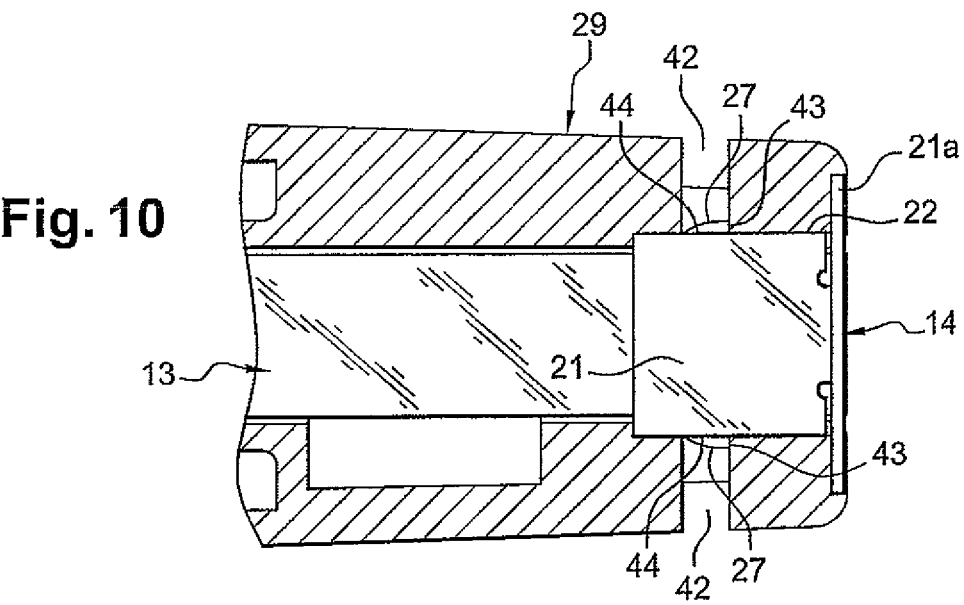
FIG. 10 is a top cross-section view of the locking device according to the invention associated with the linking means according to FIG. 5.

FIG. 10 is a top cross-section view of the locking device 14 associated with the linking means 29.

Also not able is the presence in the linking means 29 of openings 42 in which the protrusions 27 of the lateral walls 22 of the locking device 14 can become blocked.

According to the cross-section view of FIG. 10, the protrusions 27 advantageously have a straight bevelled edge 43, perpendicular to the lateral wall 22, and an edge forming an arc of circle 44, with one end meeting the lateral wall 22 and the other end meeting the straight bevelled edge 43.

Once the locking device 14 is completely inserted in the free space 31, it cannot be separated from the linking means 29 since the straight bevelled edge 43 constitutes stopping means between the locking device 14 and the linking means 29.

In this way, the windscreen wiper blade 13/locking device 14/linking means 29 assembly cannot be separated and can only be removed from the spine 3 thanks to the presence of the push button 33.

Therefore, if the user wants to replace only the windscreen wiper blade 13 of the wiper 1, he must replace the windscreen wiper blade 13/locking device 14/linking means 29 assembly.

Figure 11:
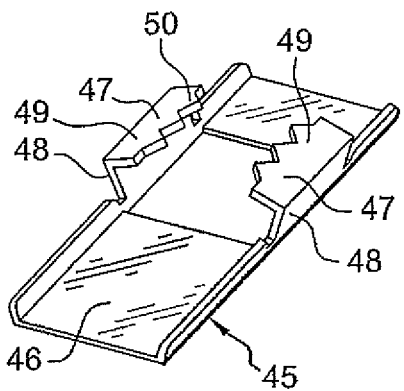
FIG. 11 is a perspective view of a second embodiment of a locking device according to the invention, in this case.

FIG. 11 is a perspective view of a second embodiment of a locking device 45 according to the invention.

In the rest of the descriptions the same reference numbers will be used to describe identical elements that have been previously described.

The locking device 45 is presented in the general form of an advantageously rectangular plate 46, with a cut-out, having on each of its lateral edges a claw 47 consisting of one vertical wall 48 and one transversal wall 49, the free end of the transversal wall 49 having advantageously triangular teeth 50.

The locking device 45 is advantageously made from a metal material.

Figure 12:
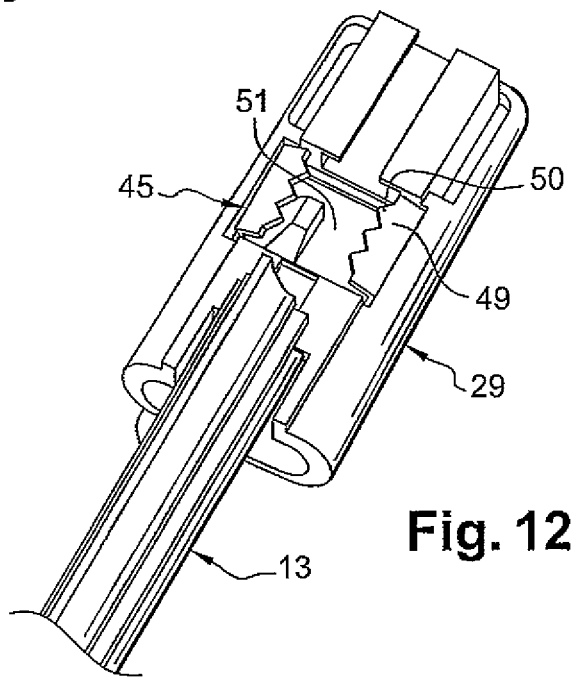

FIGS. 12 and 13 are perspective views of the locking device 45 solidly attached to the linking means 29 between the windscreen wiper blade 13 and the support frame 2, respectively before and after being solidly attached to the windscreen wiper blade 13.

The linking means 29 are of the same type as the previously described linking means, with the difference that it is planned to mould the linking means 29 directly onto the locking device 45.

Indeed, the linking means 29 advantageously have an orifice 51 that the claws 47 can pass through.

The plate 46 is advantageously flattened against the longitudinal wall 39 in the inner recess 30, as shown more specifically in FIG. 14, which is a transversal cross-section view of the linking means 29 solidly attached to the locking device 45.

The teeth 50 of the locking device 45 are advantageously capable of penetrating and becoming set in the linking element 18 of the windscreen wiper blade 13, advantageously made from rubber (after tightening or crimping, as above).

In the same way as explained previously, according to this second embodiment of the invention if the user wants to replace only the windscreen wiper blade 13, then he must press the push button 33 to separate the linking means 29 from the inner spine so as to recover the solidly attached assembly made up of linking means 29/windscreen wiper blade 13/locking device 45.

Figure 16:
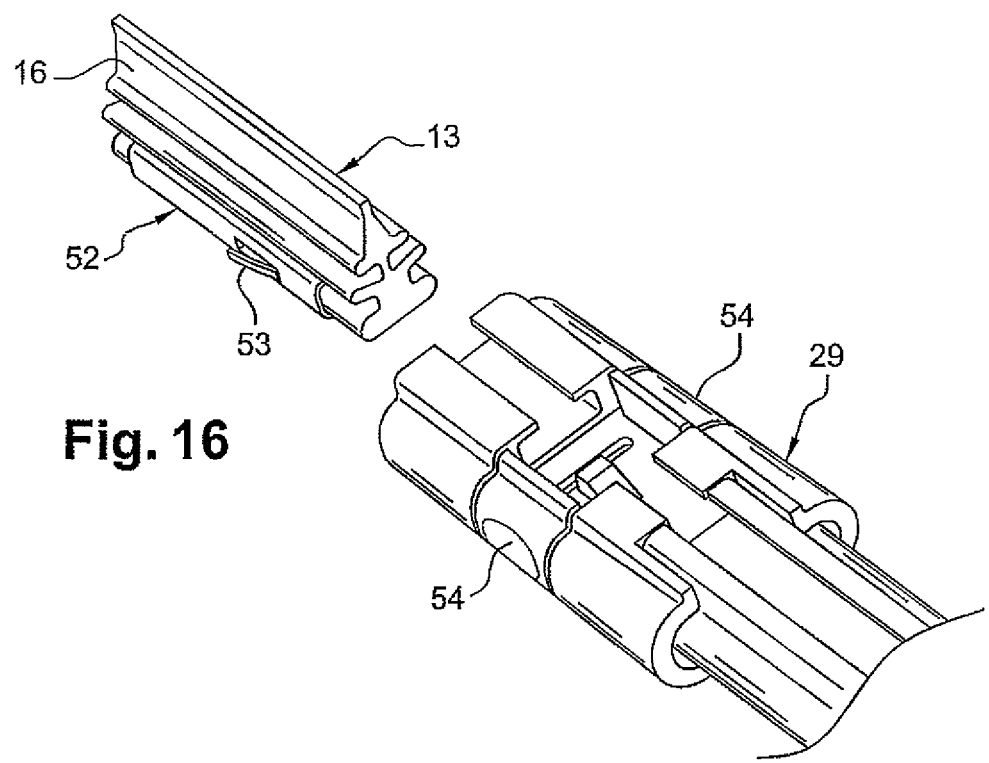

FIGS. 15 and 16 are, respectively, perspective views of a third embodiment of a locking device 52 before and after being solidly attached to the linking means 29 between the windscreen wiper blade 13 and the support frame 2.

The locking device 52 according to this third embodiment of the invention is almost identical to the locking device 14 according to the first embodiment with the exception of the protrusions 27 and the orifices 28, which are replaced, according to this embodiment, with locking tabs 53 presented in the form of a tab that sticks out slightly from the lateral walls 22 of the locking device 52 on one of the ends of the tab 53, and more precisely, the projecting free end of the tabs 53 is pointing towards the edge of the top wall 21 that is closest to the end of the blade 13 when the locking device 52 is inserted onto the blade 13 and in the linking means 29.

The locking device 52 has a pair of bottom walls 23 comprising, at least in part, blocking means 26 in the form of teeth 27 that can penetrate and become set in the linking element 18 of the windscreen wiper blade 13.

Figure 17:
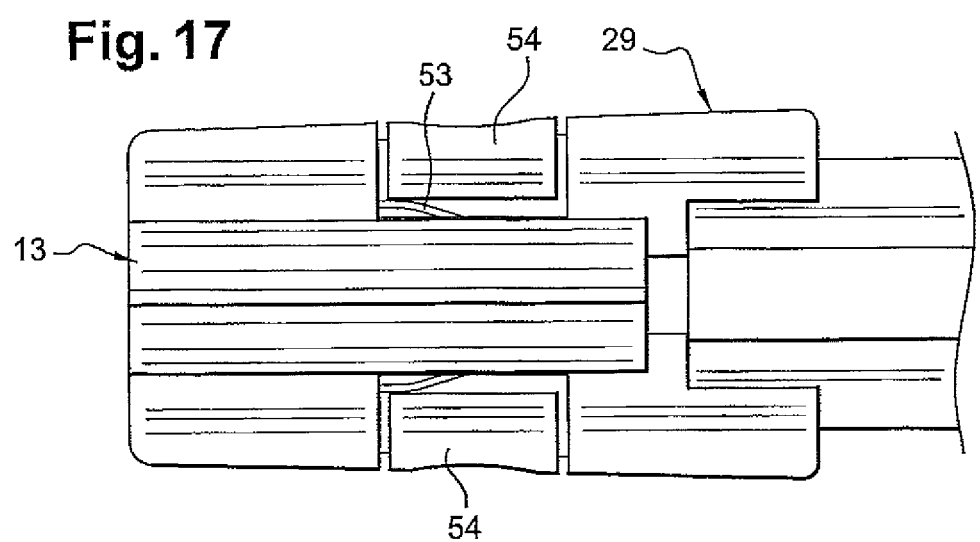
FIG. 17 is a bottom view of the linking means fixed to the windscreen wiper blade according to the third embodiment of the invention.
Figure 26:
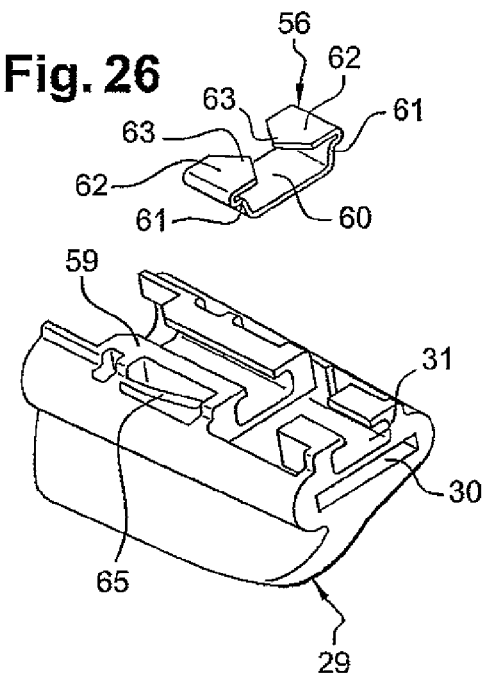
FIG. 26 is a perspective view of an alternative embodiment of the linking means capable of being solidly attached to the locking device according to the fourth embodiment of the invention.
Figure 27:
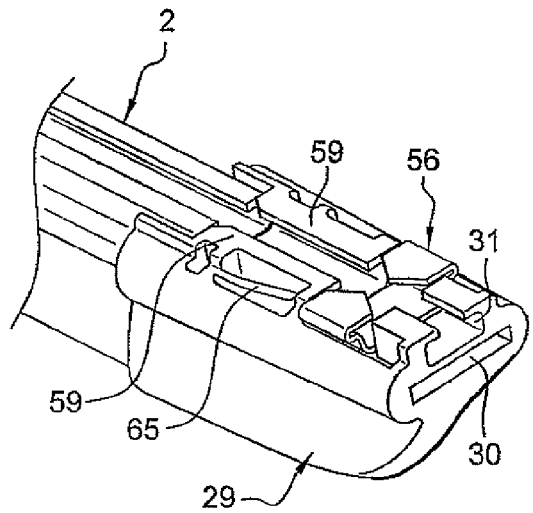
FIGS. 27 and 28 show two perspective views respectively before and after the insertion of the windscreen wiper blade in the alternative embodiment of the linking means according to the fourth embodiment of the locking device according to the invention.
Figure 28:
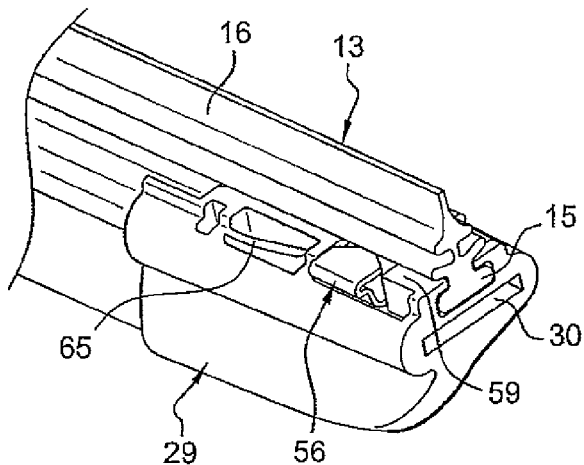
Figure 29:
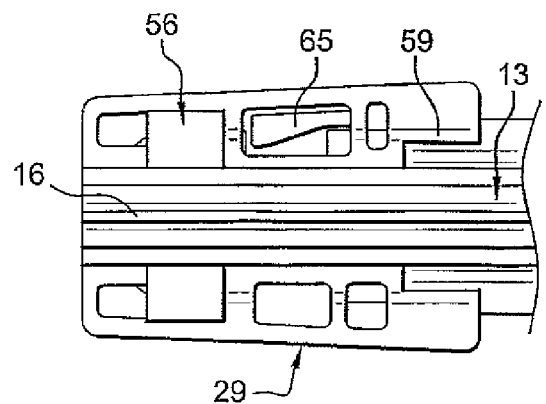
FIG. 29 is a bottom view of the alternative embodiment of the linking means capable of cooperating with the fourth embodiment of the locking device according to the invention.

The linking means 29, which capable of cooperating with the locking device 52 according to this third embodiment as shown in a bottom view in FIG. 17, have a pair of push buttons 54 that are capable of exerting a pressure on the locking tabs 53 once the locking device 52 solidly attached to the windscreen wiper blade 13 has been inserted in the linking means 29 in the free space 31.

In this way, if the user wants to replace the windscreen wiper blade 13, he must press the two push buttons 54 and thus release the solidly attached windscreen wiper blade 13/locking device 52 assembly.

Indeed, according to this embodiment of the invention, when replacing the windscreen wiper blade 13, the linking means 29 remain solidly attached to the spine 3, unlike in the previously explained cases.

FIGS. 18 and 19 are perspective views of an alternative embodiment of the third embodiment of the locking device 52, before and after insertion in the linking means 29.

FIGS. 18 and 19 therefore show the specific embodiment of the push buttons formed by cutting the lateral edges of the linking means 29 so as to leave only an edge forming a hinge 55, which therefore makes it possible to exert a pressure on the buttons 54, to deform them slightly by pivoting around this edge forming a hinge 55, thus to rest against the locking tabs 53, to flatten them against the lateral walls 22 of the locking device 52 and thereby to separate the blade 13/locking device 52 assembly from the linking means 29.

Also remarkable is the presence on the locking device 52 of a transversal wall 21a with a shape that complements the inner recess 30 so as to prevent the entry of foreign bodies in the linking means 29 (+ aesthetics).

Additionally, the transversal wall 21a is made at a slight tilt in relation to the vertical axis in the direction of the free edge of the top wall 21, so that, when unlocking the locking tabs 53, the transversal wall 21a exerts pressure on the inner edges of the recess 30 and causes the windscreen wiper blade 13/locking device 52 assembly to move slightly forward outside of the inner recess 30.

In this way, the user knows whether he pressed the push buttons 54 correctly and whether the locking device 52 is correctly unlocked from the linking means 29.

FIG. 20 is a perspective view of a fourth embodiment of a locking device 56 prior to being installed on the linking means 29 between the windscreen wiper blade 13 and the support frame 2.

According to this embodiment of the invention the linking means 29 have a material indentation 57 approximately in line with the free space 31, consisting of an opening 58 in each lateral wall 59 that makes up the free space 31.

The locking device 56 is capable of being inserted in the material indentation 57 and of filling the openings 58 in the lateral walls 59.

More specifically, the locking device 56 consists of a top wall 60, two lateral walls 61 and two bottom walls 62 in which the free end has at least one tooth 63 that can be in contact with the windscreen wiper blade 13 once the blade 13 has been inserted in the free space 31 and the two teeth 63 of the bottom walls 62 have been compressed towards each other.

FIG. 21 is a perspective view of the step of assembling the linking means 29 on the support frame 2 and of inserting the spine 3 of a windscreen wiper 1 in the inner recess 30.

In general terms, the linking means 29 have a push button 33, as described previously, allowing the separation of the spine 3 from the linking means 29.

According to this embodiment of the invention and as shown in FIG. 22, the rubber blade 14 has an advantageously longitudinal groove 64 in its linking element 18 between the top part 15 and the intermediate part 17 of the windscreen wiper blade 13.

In this way, when the windscreen wiper blade 13 is inserted in the free space 31, and as shown in FIGS. 23 and 24, the blade 13 is solidly attached to the locking device 56 by insertion by tightening of the teeth 63 of the bottom walls 62 in the groove 64.

Alternatively, it is also possible to provide a windscreen wiper blade 13 with no groove 64, the tightening and solid attachment of the blade 13 with the linking means being carried out in that case by the penetration of the teeth 63 in the linking element 18 between the top part 15 and the intermediate part 17 of the windscreen wiper blade 13.

Alternatively, the locking device 56 according to the fourth embodiment is capable of becoming solidly attached in linking means 29 such as those shown in FIGS. 26 to 29.

According to this alternative embodiment of the invention, the linking means 29 have a lug 65 at the height of one of the lateral walls 59 that make up the free space 31.

The lug 65 is advantageously made from a flexible material (the same as the end-clip since it is the same part) and is capable of blocking the spine 3 inside the linking means 29.

In an additional manner, the linking means 29 according to this embodiment of the invention do not include a push button 33. The user exerts the pressure by pushing the lug 65 inwards, for example using the point of a tool such as a screwdriver.

Due to the lack of a push button 33, the free space inside the linking means 29 is increased, which makes it possible to reduce the size of the support frame 2 (at the level of the part 9→possible change of spoiler profile).

Figure 30:
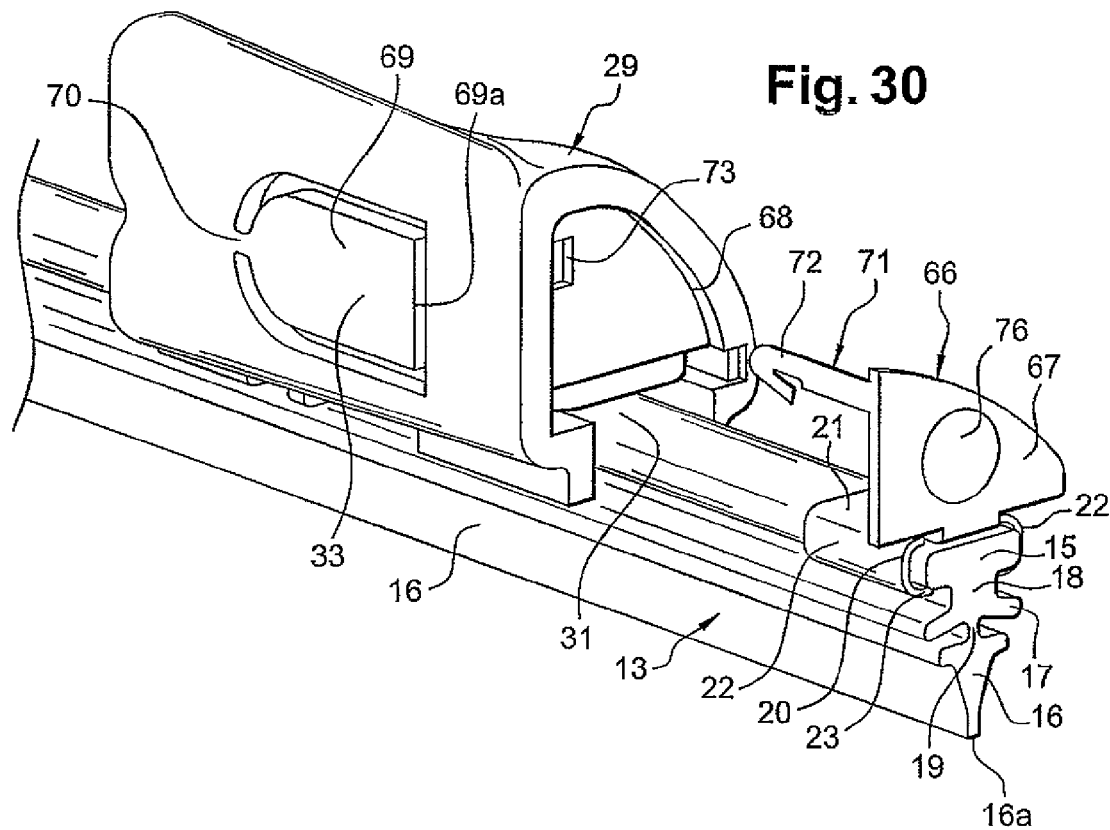
FIG. 30 is a perspective view of a fifth embodiment of the locking device according to the invention.
Figure 31:
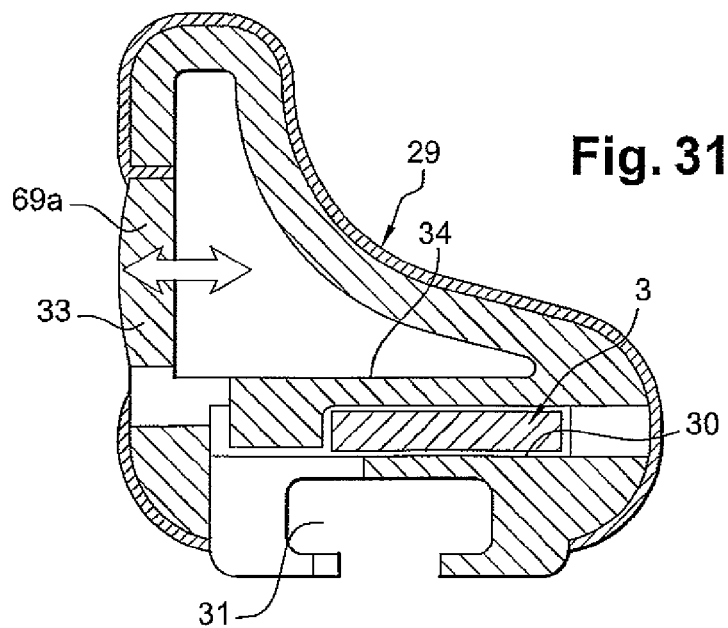
FIG. 31 is a transversal cross-section view of the linking means according to the fifth embodiment of the invention between the windscreen wiper blade and the support frame.

FIG. 30 is a perspective view of a fifth embodiment of the locking device 66 fixed on a windscreen wiper blade 13 and before being solidly attached to the linking means 29, shown in a cross-section view in FIG. 31.

The locking device 66 is of the same type as the locking device 14 according to the first embodiment. In other words, it is presented in the general shape of a hollow parallelepiped 20 in which the corners are rounded which has a shape that complements and is slightly larger than the top part 15 of the windscreen wiper blade 13.

More specifically, the hollow parallelepiped 20 is made up of a substantially horizontal top wall 21, two substantially vertical lateral walls 22 and two bottom walls 23.

The top wall 21 of the locking device 66 has a substantially vertical transversal wall 67 arranged on one edge of the top wall 21, advantageously the edge of the top wall 21 that is closest to the end of the rubber blade 13 once the locking device 66 has been inserted on this blade 13.

The transversal wall 67 is capable of becoming completely inserted in the linking means 29 and, in a more specific manner, the transversal wall 67 has a shape that complements a hollow section 68 made in the linking means 29.

The push button 33 according to this alternative embodiment of the linking means 29 consists of a U-shaped wall 69 connected to the linking means 29 by only one attachment point 70, approximately at the bottom of the U, forming a swivel axis when the user exerts a pressure on the wall 69.

More specifically, the attachment point 70 is placed so that the free end 69a of the wall 69b, in other words the edge that connects the two branches of the U, is substantially transversal with regard to the longitudinal axis of the blade 13.

The arrow in FIG. 31 shows the direction of movement of the wall 69.

The transversal wall 67 of the top wall 21 of the locking device 66 has, on its surface intended to be in contact with the indentation 68, means 71 for attaching it to the linking means 29, the attachment means 71 being presented in the shape of a hook 72.

The hollow section 68 has an orifice 73 in which the hook 72 is capable of being inserted.

Figure 32:
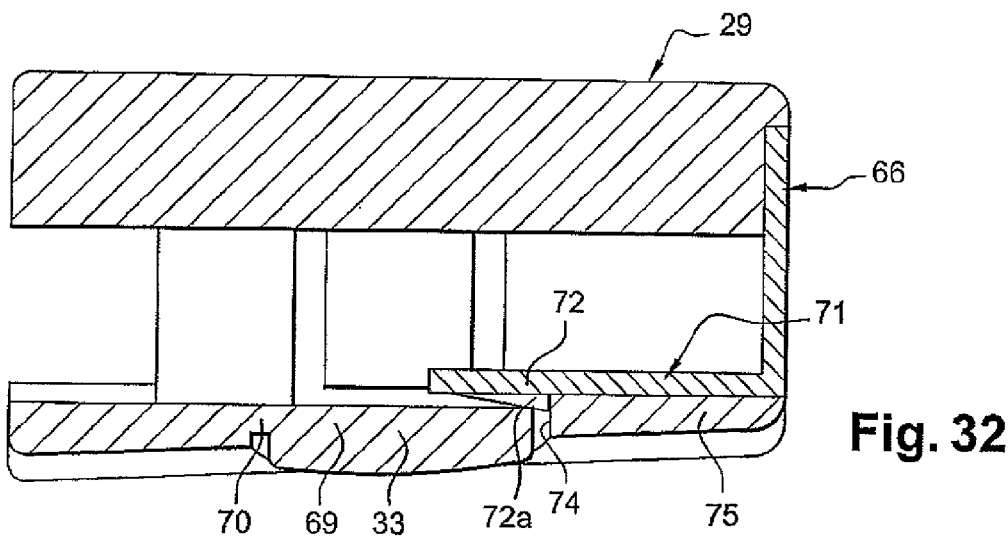
FIGS. 32 to 34 are longitudinal planar cross-section views showing the three successive steps for separating the locking device from the linking means according to the fifth embodiment of the invention.
Figure 33:
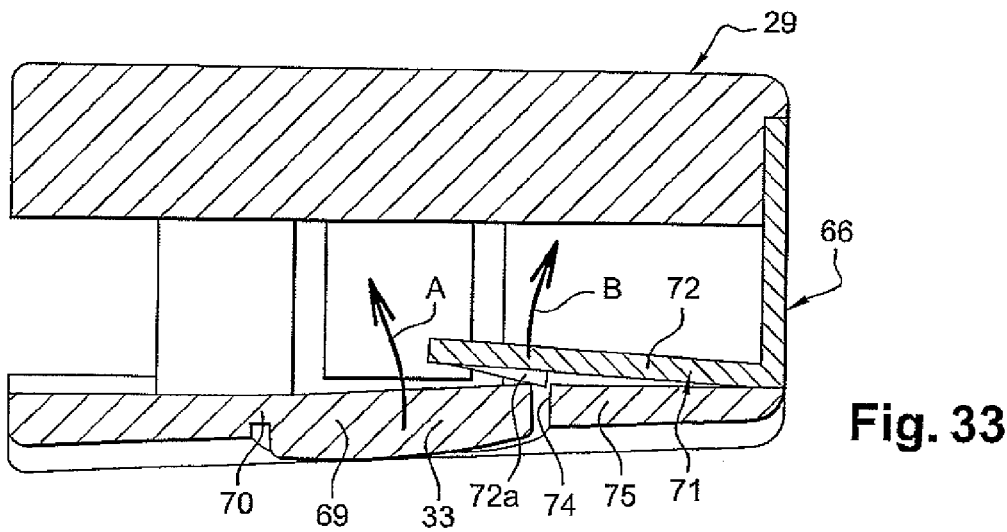
Figure 34:
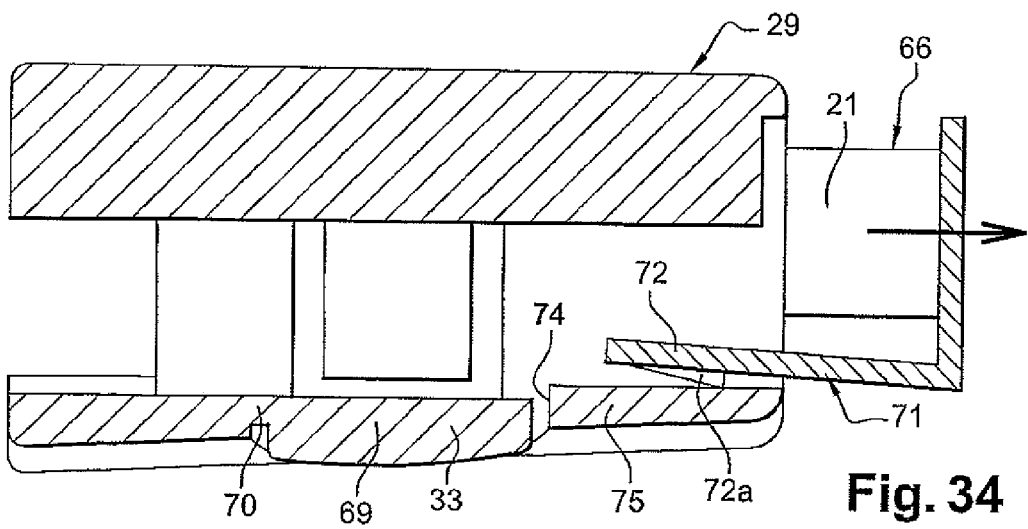

FIGS. 32 to 34 are longitudinal planar cross-section views showing the steps of separation of the hook 72 from the linking means 29.

It can also be seen that once the hook 72 and the locking device 66 are placed in the indentation 68, the end 72a of the hook 72 is resting against the edge 74 of the lateral wall 75 of the linking means 29, which is the lateral wall 75 in which the push button 33 is formed.

In this way, the hook 72 does not allow any longitudinal movement of the locking device 66 and prevents the separation of the is device 65 from the linking means 29.

To do so, the user must, first of all, press against the wall 69 that forms the push button 33, thus causing a slight swiveling movement of the wall 69, as shown by arrow A in FIG. 33, this movement causing a movement of the hook 72, as shown by arrow B in FIG. 33.

In this way, the end 72a of the hook 72 is released from the edge 74 of the lateral wall 75 of the linking means 29.

Therefore, if the user wants to replace the windscreen wiper blade 13, he must separate the locking device 66/windscreen wiper blade 13 assembly from the linking means 29, the linking means 29 remaining, according to this embodiment of the invention, solidly attached to the spine 3.

Additionally, it is provided for an aging patch 76 of a known type, to be placed on the face of the transversal wall 67 that is not attached to the linking means 29, thus making it possible to check the state of wear and aging of the windscreen wiper blade 13 so as to be able better to appreciate when the blade 13 must be replaced.

When the aging patch 76 shows a certain degree of wear, the user must change either the wiper 1, or only the blade 13 and the locking device 66.

A new aging patch 76 is then placed on the locking device 66.

The invention claimed is:

1. A windscreen wiper of a flat blade type comprising a locking device between a blade holder and a blade,
    wherein the blade comprises a top part that cooperates with the blade holder and a bottom part that directly contacts a windscreen or a window to be wiped, wherein the blade holder is elongated and defines an inner space extending substantially the entire length thereof receiving the top part of the blade therein;
    wherein the locking device has a shape that complements the top part of the blade;
    wherein the windscreen wiper further comprises linking means that connect one of the ends of the blade holder to one of the ends of the blade;
    wherein the locking device is capable of being solidly attached to the linking means;
    wherein the linking means comprises:
        an inner recess that receives a spine of the windscreen wiper that is inserted into the inner recess, and
        a free space where the top part of the blade is inserted; and
    wherein the locking device is capable of being inserted in a material indentation made in the linking means to form a part of each lateral wall that makes up the free space.

2. The windscreen wiper of claim 1, further comprising blocking means of the blade in the form of at least one tooth that is capable of being partially inserted in the blade.

3. The windscreen wiper of claim 1, further comprising blocking means of the blade in the form of at least one tooth that is capable of being inserted in a groove made in the blade.

4. The windscreen wiper of claim 1, wherein the locking device is made from a metal material.

5. The windscreen wiper of claim 1, wherein the device is solidly attached to the blade and the linking means.

6. The windscreen wiper of claim 1,
wherein the linking means have separating means that are capable of separating the blade, the locking device, and the linking means from the spine; and
wherein the blade, the locking device, and the linking means form an integral assembly.

7. The windscreen wiper of claim 6, wherein the separating means comprise at least one push button.

8. The windscreen wiper of claim 1, wherein the spine is held in the inner recess by hooking means.

9. The windscreen wiper of claim 8, wherein the hooking means are in the form of a flexible flap comprising one end forming a hook.

10. The windscreen wiper of claim 1, wherein the locking device formed as a hollow parallelepiped consisting of a top wall, two lateral walls, and two bottom walls, a free end of the bottom walls comprising at least one tooth.

11. The windscreen wiper of claim 1, wherein a lug is provided on the linking means, which is capable of separating the spine from hooking means in the form of a flexible flap.

* * * * *